United States Patent
Juels

(10) Patent No.: US 7,472,093 B2
(45) Date of Patent: Dec. 30, 2008

(54) TARGETED DELIVERY OF INFORMATIONAL CONTENT WITH PRIVACY PROTECTION

(75) Inventor: Ari Juels, Brookline, MA (US)

(73) Assignee: RSA Security Inc., Bedford, MA (US)

( * ) Notice: Subject to any disclaimer, the term of this patent is extended or adjusted under 35 U.S.C. 154(b) by 0 days.

(21) Appl. No.: 09/802,278

(22) Filed: Mar. 8, 2001

(65) Prior Publication Data
US 2002/0026345 A1 Feb. 28, 2002

Related U.S. Application Data

(60) Provisional application No. 60/187,671, filed on Mar. 8, 2000.

(51) Int. Cl.
*G06F 17/60* (2006.01)

(52) U.S. Cl. .................................. 705/80; 705/51

(58) Field of Classification Search ................ 705/80, 705/14, 51
See application file for complete search history.

(56) References Cited

U.S. PATENT DOCUMENTS

| | | | | |
|---|---|---|---|---|
| 5,754,938 A | * | 5/1998 | Herz et al. ................ | 725/116 |
| 5,835,087 A | * | 11/1998 | Herz et al. ................ | 715/810 |
| 6,249,772 B1 | * | 6/2001 | Walker et al. ............. | 705/26 |
| 6,460,036 B1 | * | 10/2002 | Herz .......................... | 705/14 |
| 2001/0049620 A1 | * | 12/2001 | Blasko ....................... | 705/10 |
| 2003/0037041 A1 | * | 2/2003 | Hertz ......................... | 707/1 |

FOREIGN PATENT DOCUMENTS

JP 2002007594 A * 1/2002

* cited by examiner

*Primary Examiner*—Pierre E Elisca
(74) *Attorney, Agent, or Firm*—BainwoodHuang

(57) ABSTRACT

A system and method for enabling use of detailed consumer profiles for the purposes of targeted information delivery while protecting these profiles from disclosure to information providers or hostile third parties are disclosed herein. Rather than gathering data about a consumer in order to decide which information to send her, an information provider makes use of a client-side executable software module called a negotiant function. The negotiant function acts as a client-side proxy to protect consumer data, and it also directs the targeting of information, requesting items of information from the information provider that are tailored to the profile provided by the consumer.

16 Claims, 6 Drawing Sheets

STEP 61: $C \xleftarrow{f} A$

STEP 62: C computes $r = f(P)$ and encrypts $E_y[r]$

STEP 63: $C \xrightarrow{E_y[r_1]} BB$

STEP 64: Servers encrypt $ad_i$ to generate $U_1 = \{(j, E_y[ad_j])\}_{j=1}^{n}$ STEP 65: Servers mix $U_1$ by random secret permutation $\sigma$ to obtain $U_2 = (E_y[\sigma(j)], E_y[ad_{\sigma(j)}])_{j=1}^{n}$ STEP 66: Servers perform a distributed plaintext equality test to find $E_y[j] \sim E_y[r]$ and obtain $U_3 = (E_y[r], E_y[ad_r])$ STEP 67: Servers apply quorum controlled asymmetric proxy re-encryption to obtain $E_{yci}[ad_r]$ STEP 68: $C \xleftarrow{E_{yci}[ad_r]} A$ STEP 69: C decrypts $E_{yci}[ad_r]$ to receive $ad_r$

STEP 41

$C_1$ computes $r_1 = f(P_{C1})$
$C_2$ computes $r_2 = f(P_{C2})$
$C_3$ computes $r_3 = f(P_{C3})$
STEP 42

STEP 43

STEP 44

$r_i$ causes A to select $ad_{ri}$  STEP 45

STEP 46

STEP 47

TARGETED DELIVERY OF INFORMATIONAL CONTENT WITH PRIVACY PROTECTION

RELATED APPLICATIONS

This application claims the benefit of and priority to U.S. provisional patent application Ser. No. 60/187,671, filed on Mar. 8, 2000, the disclosure of which is incorporated herein by reference in its entirety.

TECHNICAL FIELD

The present invention generally relates to a system and method for delivering targeted informational content to consumers while protecting sensitive consumer data. In particular, the present invention relates to digital privacy protection techniques that employ a client-side executable software module as an intermediary.

BACKGROUND INFORMATION

In a typical network in which advertisements or other information is delivered, such as a conventional television network, the advertisements are delivered to many customers indiscriminately. This is disadvantageous for the customers because some customers are subjected to advertisements in which they have no interest. It is also disadvantageous to the advertisers because the advertisers must pay to deliver the advertisement to a large audience of customers including the customers they desire to reach and the customers who have no interest in the advertisement.

In another advertising strategy, the advertisers target a selected group of consumers who are more likely to be interested in the advertisements and deliver the advertisements to only such elected group. This advertisement strategy consequently leads to greater consumer market efficiency. Until recently, such targeted advertisement was not possible because the communications network in which the advertisements were delivered did not permit delivery of advertisements to selected customers only. Recent advances in communications networks, however, and, particularly, the advent of the World Wide Web ("the Web"), have made possible such selective delivery of advertisements or other kinds of information. In order to implement the targeted information delivery strategy, the information providers must be able to identify the consumers to whom the items of information are targeted. The Web has introduced an opportunity for interested parties to facilitate such determination by aggregating consumer data in a digital form, including users' "surfing" habits, consumption patterns, and demographic data. Despite economic and social benefits of targeted advertising, however, there are grave concerns among consumers about the invasion of privacy and potential abuses by aggregators of consumer data and hostile third parties.

Companies, such as Zero-Knowledge Systems, have offered server-based privacy protection to customers. In this approach, customers use an encrypted channel to access one or more proxy servers that anonymously reroute requests to destination servers. The system relies on trustworthy servers to shield the client from positive identification. The client must trust at least one of the servers to ensure his or her anonymity and not to eavesdrop on or tamper with his or her communications.

Another approach is the Crowds project, in which disparate users are grouped and their requests for Web pages are randomly rerouted through other "crowd" members. The identity of one group member is thus rendered indistinguishable from that of other members. The system relies on a trustworthy entity organizing the crowd and trustworthy fellow group members. Each member must trust other crowd members not to eavesdrop on or tamper with communications and not to perform network traffic analysis. Server-based systems such as Crowds provide some degree of privacy protection, but do not offer an adjustable level of control of access to consumer data.

The Platform for Privacy Preferences Project (P3P) is a standard designed to enable consumers to exercise control over their personal data. The P3P concept is to have Web sites publish specifications of their privacy policies precisely thereby allowing consumers to exercise control over their personal data in response to these policies. Particularly, P3P enables consumers to define preferences over which elements of personal data they are willing to divulge, as well as to respond to incompatible policies of a given Web site.

Another system known in the art combines properties of the P3P and proxy server systems. This system enables users to browse the World Wide Web using a variety of different "personae". It offers controls for the user in the release of information, and also permits merchants to collect information in a controlled manner. The system aims to accommodate existing infrastructural elements, and assumes that the use of periodic merchant auditing, in conjunction with consumer control, will achieve adequate privacy protection. P3P and related systems presume that mediation between consumers and data collectors will consist of allowing consumers to select what data to reveal.

SUMMARY OF THE INVENTION

An object of the present invention is to provide a practical method for targeting information being sent to a consumer, which preserves privacy of sensitive consumer data. In particular, it is an object of the present invention to enable consumers and data collectors to jointly decide in a privacy-protecting manner what information should be provided to the consumers. Another object of the invention is to provide a technology that complements proxy servers, Crowds, and/or P3P and is deployable in conjunction therewith.

In general, in one aspect, the invention relates to a system and method for enabling use of detailed consumer profiles for targeted information delivery while protecting these profiles from disclosure to information providers or hostile third parties. Rather than gathering data about a consumer in order to decide which information to send her, an information provider makes use of a client-side executable software module called a negotiant function. The negotiant function acts as a client-side proxy to protect consumer data, and also directs the targeting of information.

The negotiant function requests elements of information from the information provider that are tailored to the characteristics of the consumer. The information provider can control the palette of elements of information available to the negotiant function, as well as the process by which the negotiant function determines which elements of information to request. At the same time, the information provider receives no data about the consumer profile beyond which elements of information the negotiant function requested. In some embodiments of the present invention, the negotiant function is part of a protocol whereby the information provider does not even learn which elements of information a specific consumer has requested, but only sees requests for information in the aggregate. The end result is that the information provider is able to target information with a high degree of precision and sophistication, as well as to gather data on information display rates, all without learning sensitive, private data about individual consumers.

In a broad aspect, the invention relates to a method for enabling targeted information retrieval while protecting consumer privacy. A negotiant function designed to accept a plurality of elements of data associated with a consumer as input and produce an information request as output is specified. Such an information request designates at least one element of information to be presented to the consumer. The negotiant function is distributed to the consumer for execution.

In one embodiment, the information request produced by the negotiant function is transmitted to the information provider, and at least one element of the information is transmitted to the consumer in response to the information request. In one embodiment, the request is communicated through a proxy server.

In another aspect the invention features a method for enabling targeted information retrieval while protecting consumer privacy by processing aggregated requests. A negotiant function, designed to accept a plurality of elements of data associated with a consumer as input and produce an information request as output, is distributed for execution. The resulting information request designates at least one element of information to be presented to the consumer. A plurality of information requests is received, where a first information request is associated with a first consumer and is obtained by applying a first negotiant function to an element of information associated with the first consumer and a second information request is associated with a second consumer and is obtained by applying a second negotiant function to an element of information associated with the second consumer.

In one embodiment, a plurality of request pairs is aggregated in a sequence. Each of the plurality of request pairs comprises an information request and an identifier. The method further includes the step of transmitting the plurality of request pairs to the information provider.

In another embodiment, a plurality of information requests is encrypted. A plurality of request pairs, where each of the plurality of request pairs comprises an encrypted information request and an identifier, is aggregated in a sequence. In yet another embodiment, the method further includes the step of applying a first plurality of request pairs having a first sequence to a mix network to obtain a second plurality of request pairs having a second sequence. Each of the first plurality of request pairs consists of an information request encrypted with a first public key and a first random encryption factor, and an identifier. Each of the second plurality of request pairs consists of an information request in plaintext and the identifier encrypted with a second public key, and a second random encryption factor. The second sequence is the first sequence permuted by a random secret permutation. In still another embodiment, the method further includes the step of replacing the information request in each of the second plurality of request pairs with an item of information to create a plurality of response pairs.

In yet another aspect, the invention features a method for targeted information retrieval while protecting consumer privacy by comparing blinded ciphertexts. A negotiant function, designed to output an information request, is distributed for execution. A request pair is received in response to the execution of the negotiant function. The request pair includes a consumer identifier, the information request encrypted with a first public key, and a first random encryption factor having a first underlying plaintext. A first plurality of information pairs with a first sequence is constructed in response to the request pair. The first plurality of information pairs consists of an element identifier, an element of information encrypted with a second public key, and a second random encryption factor. The first plurality of information pairs is applied to a mix network to obtain a second plurality of information pairs with a second sequence comprising the first sequence permuted by a random secret permutation. The second plurality of information pairs consists of the element identifier encrypted with a third public key and a third random encryption factor, and the element of information re-encrypted with the third public key and the third random encryption factor having a second underlying plaintext. A distributed plaintext equality test is performed to identify at least one of the second plurality of request pairs in which the second underlying plaintext is identical to the first underlying plaintext.

Some embodiments are systems that implement one or more of the foregoing methods or variations thereof.

Thus, the invention provides the art with a heretofore unappreciated system and method for delivering information, which is targeted and customized with precision and sophistication to individual consumers, while protecting sensitive data about the consumers' demographics, Web browsing habits, online purchasing history, and other personal information. In accordance with the present teachings, the invention can be used to target advertisements, news articles, product updates, and other consumer information.

These and other objects, along with advantages and features of the invention disclosed herein, will be made more apparent from the description, drawings and claims that follow.

BRIEF DESCRIPTION OF THE DRAWINGS

In the drawings, like reference characters generally refer to the same parts throughout the different figures. Also, emphasis is generally being placed upon illustrating the principles of the invention.

DEFINITIONS

In order to more clearly and concisely point out the subject matter of the claimed invention, the following definitions are provided for specific terms used in the following written description and appended claims.

Key. As used herein, a "key" is a secret used to encrypt and/or decrypt data.

Public-key Cryptography. As used herein, "public-key cryptography" is a cryptographic system that uses two keys, a public key that may be published, and a private key that is private to one party, wherein the private key is linked mathematically to the public key so that the public key can be used to decrypt data encrypted with the private key and/or vice-versa. A few examples of public key cryptosystems are Diffie- Hellman, RSA, El Gamal, Elliptic Curves, and Probabilistic Encryption by NTT. Public-key Cryptography is also referred to as asymmetric encryption.

Threshold Cryptographic System. As used herein, a "threshold cryptographic system" is a system where a cryptographic protocol is executed by m participants, where $m \geqq 1$, such that protocol privacy and the correctness of the output are ensured given a majority coalition of any t uncorrupted participants. A majority of uncorrupted participants can successfully decrypt a message, but the security and functionality properties of the system are retained even if the adversary corrupts up to m-t participants. In such a system, participants hold a private key x in a distributed fashion, with a corresponding published public key $y=g^x$.

Private Information Retrieval ("PIR"). As used herein, "PIR" is a protocol that enables a consumer to request an element of information of his choice from a server, for example an advertisement, in such a way that the server learns no information about the request, other than the request itself.

Threshold PIR. As used herein, "threshold PIR" is a variant of a private information retrieval protocol, which uses a plurality of communicating servers, wherein a majority of these communicating servers are uncorrupted. Embodiments of the invention achieve a threshold PIR efficiently through reliance on a mix network.

Semi-private PIR. As used herein, "semi-private PIR" is a private information retrieval protocol in which requests from a large number of consumers are batched, and it is acceptable for servers to learn what has been requested, but not by whom. In other words, the semi-private PIR protocol permits full disclosure of aggregate information, but shields information regarding the requests of individual consumers.

DETAILED DESCRIPTION OF THE INVENTION

Figure 1:
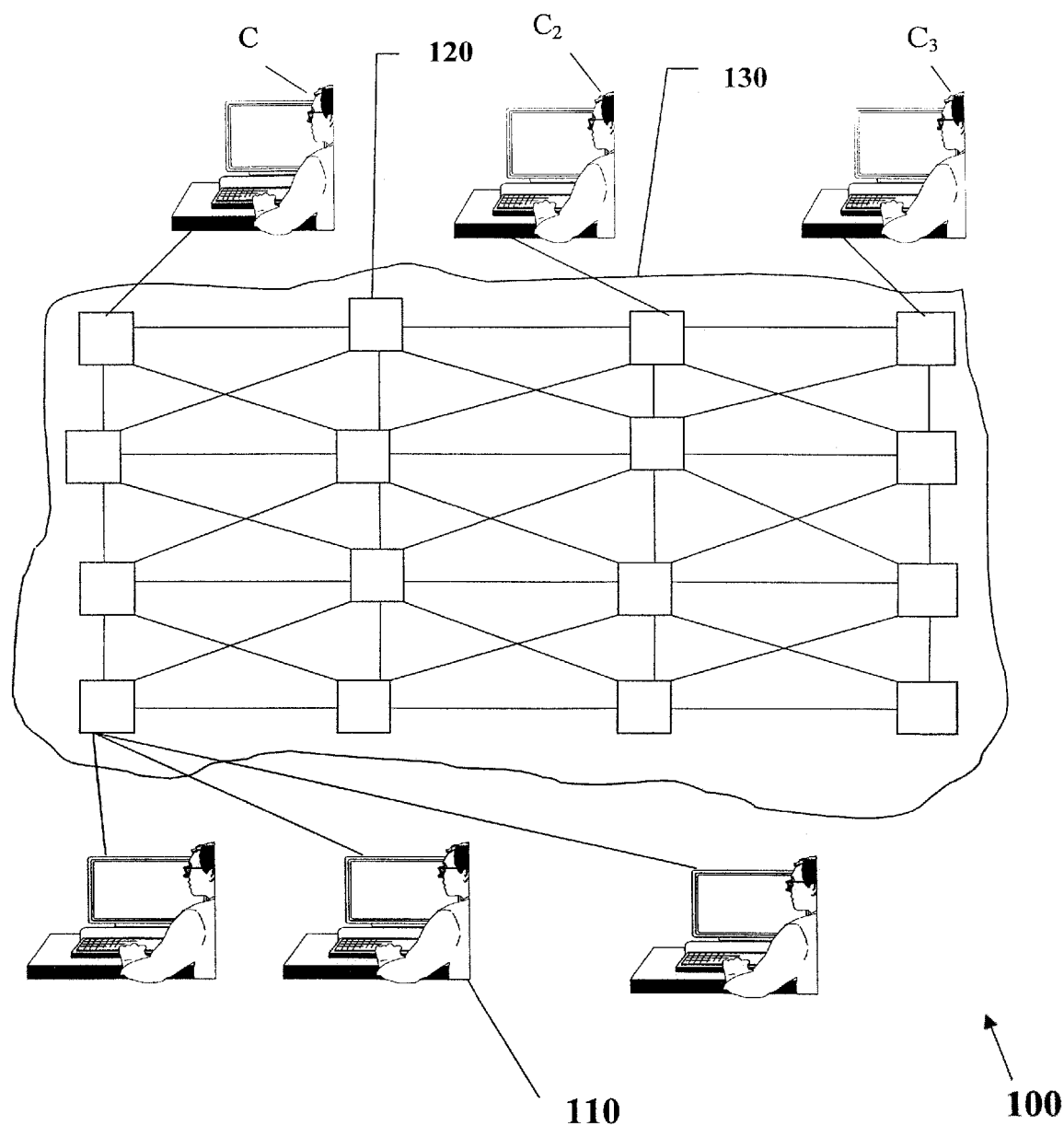
FIG. 1 is a high-level block diagram of an exemplary distributed network with which embodiments of the present invention may be used.

Referring to FIG. 1, a system and method for delivering targeted informational content to consumers while protecting sensitive consumer data is implemented over an exemplary distributed network 100. As used herein, a consumer $C_i$ may include any entity who or that can participate in a negotiant protocol and can receive informational content including without limitation a person and a computer. For simplicity of discussion, an entity and a network node used by the entity may be referred to together as a consumer $C_i$, without reference to whether a described task is performed by the entity or a network node operating on behalf of the entity. The distributed network 100 includes a plurality of consumer nodes 110 and server nodes 120 that are interconnected by a network of communication links 130. Some of the nodes 110 and 120 may act as a proxy, which requests and relays responses for another node. As used herein, the term server is construed broadly, and may include any source of informational content on the network 100. Although the illustrated embodiments are suitably implemented for and used over the Internet, various embodiments of the invention may be associated with any communication network, whether wired or wireless, broadcast or point-to-point or some combination thereof, that has nodes capable of providing informational content and distributing it to consumers.

Figure 2:
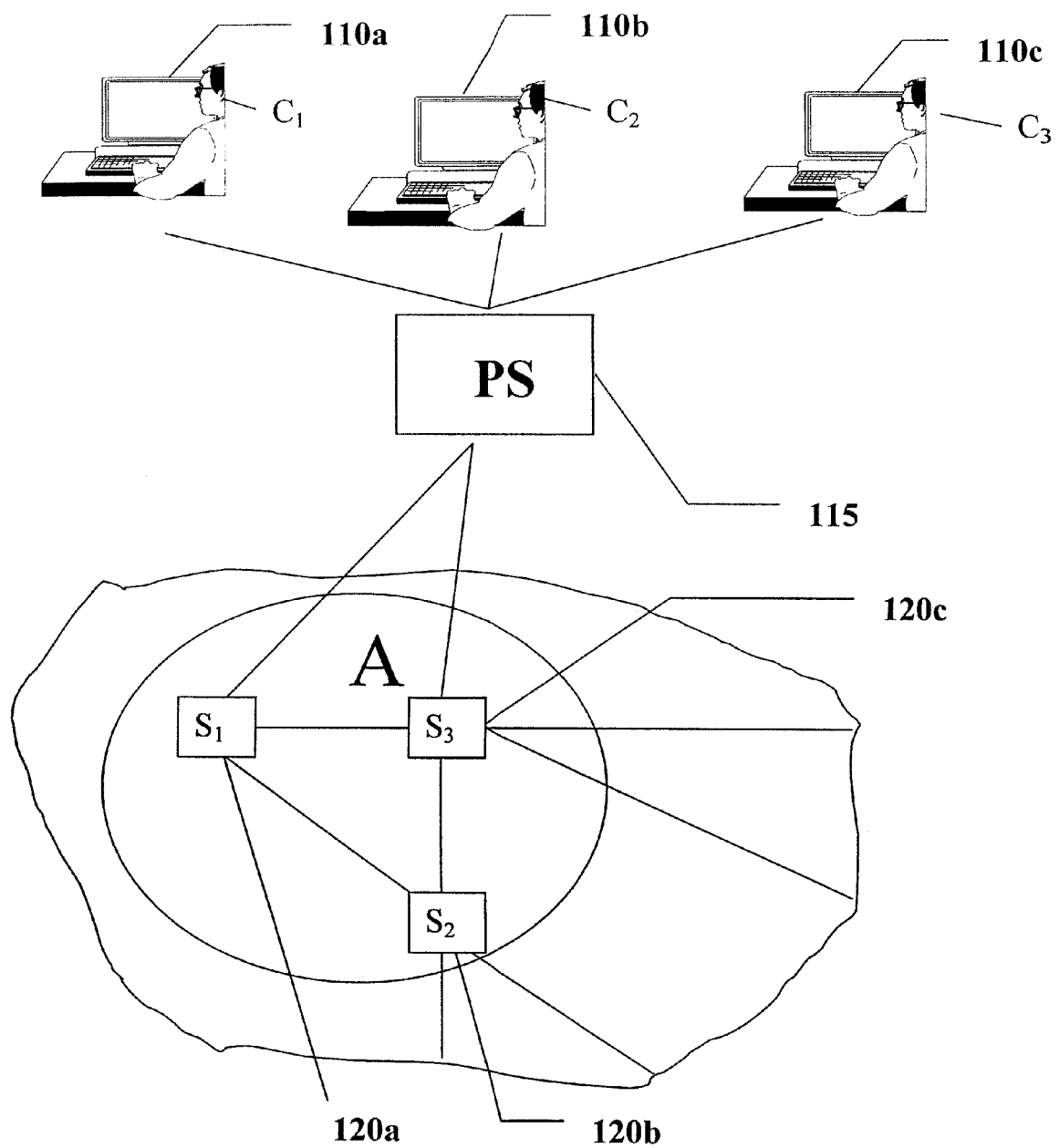
FIG. 2 is a block diagram of a portion of the distributed network of FIG. 1.

Referring to FIG. 2, consumer nodes 110a, 110b, and 110c are in a portion of the network 130 that also includes a proxy server 115 and the server nodes 120a, 120b, and 120c. Consumers $C_1$, $C_2$, and $C_3$ use the consumer nodes 110a, 110b, and 110c, respectively, to access the network. Information is directed to consumers $C_1$, $C_2$, and $C_3$ by the servers 120.

The information generated by the servers 120 for delivery to consumers 110 may include advertisements, news articles, product updates, press releases, and other kinds of information, which may be of interest to consumers. For illustration purposes, the description that follows uses an advertisement as a non-limiting example of such an element of information. Embodiments of the present invention are described in the context of targeting of advertisements, and it is intended that an advertisement be considered a non-limiting example of an information item to be communicated to an information consumer. An advertiser A provides advertisements from the set AD that is the set of advertisements $\{ad_1, ad_2, \ldots, ad_n\}$ that A may distribute.

The consumers $C_1$, $C_2$, and $C_3$ each have a plurality of elements of data associated with them. The data elements may include demographic information such as age, sex, profession, annual income, and so on, as well as other information such as history of online purchases, time spent online over a period of time, and recently visited Web sites and search engine queries. One or more elements of data associated with a particular consumer is referred to as that consumer's profile P. A consumer may provide certain data elements of her profile P deliberately to Internet Service Providers (ISPs), online merchants or information providers, while other elements of her profile P may be collected during the consumer's connection to and use of network 130 without her knowledge using "cookies" or other methods. Typically, most elements of the consumer's profile are stored on the consumer node 110, although some elements may be stored on another network node.

The advertiser chooses a negotiant function $f_{AD}$, which takes one or more elements of the profile $P_i$ of consumer $C_i$ as input and produces a selection of one or more advertisements from AD to provide to the consumer. The negotiant function acts as a client-side proxy to protect consumer data, and also directs the targeting of information. The negotiant function $f_{AD}$ may provide an actual selection as output, or the negotiant function may provide an output that can be used to derive an advertisement selection. The negotiant function $f_{AD}$ may be simple or quite complex. The negotiant function $f_{AD}$ may take some or all of the information in the consumer's profile P as input. The negotiant function $f_{AD}$ need not take AD explicitly as input, even if its output is indirectly dependent on AD. As an example, in one embodiment, $f_{AD}$ is a function that derives a list of the most common words in the Web sites visited by the consumer and matches these to text descriptors associated with the advertisements in AD.

The negotiant function $f_{AD}$ may be implemented as a software module running on the consumer's node 110. Such a software module could be implemented in various programming languages, such as C, Java™, or Visual Basic™, and provided in source code or object code form. Alternatively, the negotiant function $f_{AD}$ may be implemented in special purpose hardware or in firmware on a processor; these implementation choices provide varying distribution cost, security, and performance benefits to the consumer. As described below, there may be benefits to making the negotiant function $f_{AD}$ as open to inspection as possible, to prevent abusive negotiant functions $f_{AD}$ from being introduced into a consumer's node, and to build consumer confidence.

In one embodiment, the set of advertisements AD is consistent from consumer to consumer. In this case, the negotiant function could be designated f without the subscript. In other embodiments, the definition of the negotiant function is extended to include inputs other than the data elements in consumer profiles P, such as the current date, or a list of advertisements already sent to the consumer.

In one embodiment, the advertiser's servers 120a, 120b, and 120c share a bulletin board, to which all consumers post advertisement requests. As used herein, a "bulletin board" is a shared data storage or channel accessible over a network to which any node has access to view or add a new entry, but in which no node (other than possibly an administrator) may edit an entry or erase any portion thereof. A bulletin board may be realized as a public broadcast channel. Postings to a bulletin board may be made authenticable, that is their source may be securely validated, through use of digital signatures or other authentication methods.

In one such embodiment, servers perform any necessary computation and then initiate communication with consumers and dispense advertisements to them. This may occur upon receiving the request, or, for example, when a predetermined number of requests have accumulated, or when some other triggering criterion occurs.

The form of the communication between the consumers and servers is specified by a negotiant protocol, which is a protocol by which a server receives a request that is an output of the negotiant function (or derived from the output of the negotiant function). Various protocols can be used to communicate negotiant function output to a server. Examples of such protocols follow along with some discussion of the protocols' privacy and security properties.

A negotiant protocol can be characterized by at least three levels of privacy. These levels indicate the degree of privacy protection available under the protocol. For example, a negotiant protocol has (t, m)-privacy if for any adversary $A_1$ that actively controls a set of t servers $S_m$ and has knowledge of $f$ and AD, but does not control consumer $C_i$, the protocol transcript reveals no significant information the about the profile $P_i$, even if $A_1$ controls all other consumers. This is the highest level of privacy protection.

A negotiant protocol can be characterized as having (t, m)-group privacy if the protocol transcript reveals no significant information about $P_i$ other than that revealed by the aggregate information requests of the participating consumers. The property of group privacy means that an advertiser can learn only the aggregate information requests of a group of consumers. The special case of a single server, i.e. (1, 1)-group privacy, is referred to as profile privacy. This limited but still valuable form of privacy means that an advertiser learns the information request $f(P_i)$ of any given consumer $C_i$, but no additional information about $P_i$.

The characterizations of a negotiant protocol as having a (t, m)-privacy, (t, m)-group privacy or profile privacy are useful for understanding the privacy-protecting properties of the invention. A negotiant protocol can be further categorized as having aggregate transparency and robustness. A negotiant protocol is aggregate transparent if any server can determine the set $\{f(P_1), f(P_2), \ldots, f(P_k)\}$—in an unknown, random order—with overwhelming probability. In real-world advertising scenarios, it may be important that a protocol is aggregate transparent, as the clients of advertisers typically wish to know how many times their advertisements have been displayed. A negotiant protocol is robust if, given an adversary that controls a minority coalition of servers, every consumer $C_i$ receives an advertisement $ad_i$ as requested by $f(P_i)$ with overwhelming probability. In other words, the adversary is incapable of altering or making substitutions for the advertisement requested by consumers.

Consumers and advertisers engage in the negotiant protocol to enable targeted delivery of advertisements to consumers while protecting sensitive consumer data in accordance with the embodiments of the present invention as described below.

Figure 3:
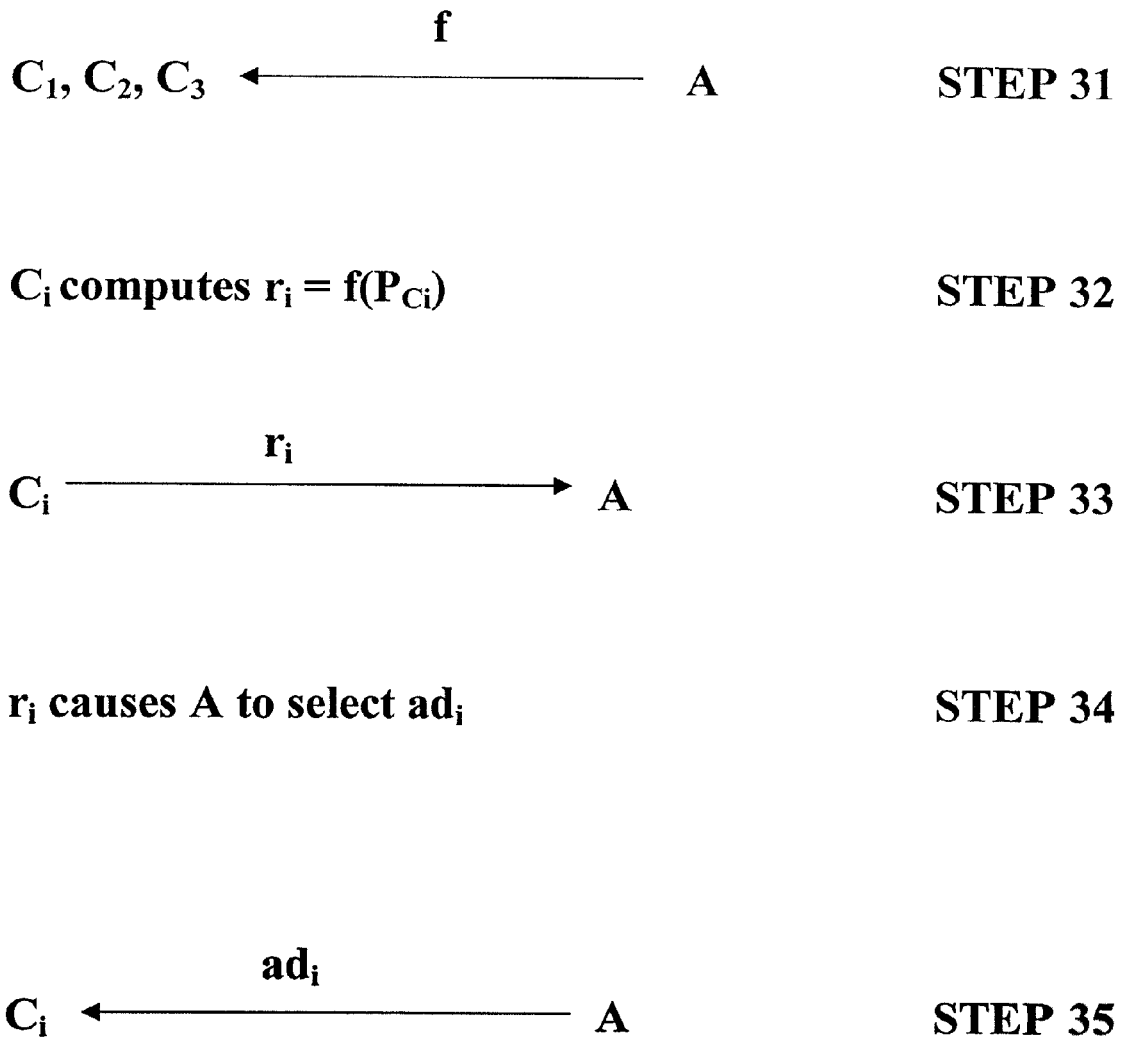
FIG. 3 is a flow diagram of one embodiment of a method of the present invention.

Referring to FIG. 3, in one embodiment, a negotiant function $f$ is specified and distributed to one or more consumers $C_i$ by the advertiser A for execution (STEP 31). The execution of the negotiant function $f$ by each consumer $C_i$, produces an information request $r_i = f(P_i)$, which designates at least one advertisement $ad_i$ (STEP 32). Each consumer transmits the information request $r_i$ to the advertiser A (STEP 33). In response to the information request, the advertisement $ad_i$ is presented to the consumer $C_i$ (STEP 34).

Figure 4:
FIG. 4 is a flow diagram of another embodiment of a method of the present invention.
Figure 4:
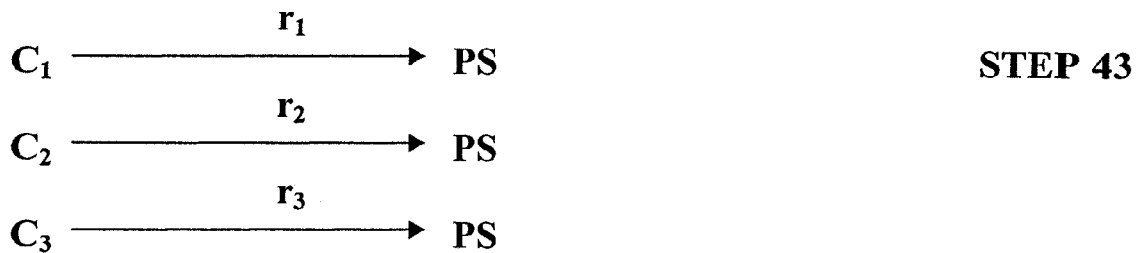
Figure 4:
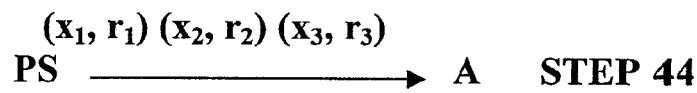
Figure 4:
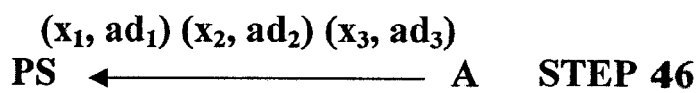
Figure 4:

Referring to FIG. 4, in another embodiment that is a variation of the embodiment of FIG. 3, a proxy server PS is interposed between consumers $C_i$ and the advertiser A. Each consumer generates an information request $r_i$ and transmits it to the proxy server PS (STEPS 42-43). The proxy server PS aggregates requests, which in this embodiment takes the form of request pairs in a sequence. Each of the request pairs includes an information request $r_i$ and an identifier $x_i$ associated with consumer $C_i$. Unlike a profile, an identifier of consumer $C_i$ does not contain any of her sensitive data, and merely serves to identify the consumer's node on a network. In one embodiment, an identifier includes the network address of the consumer's node $C_i$. The proxy server PS then transmits the request pairs to the advertiser A (STEP 44). In one embodiment, the proxy server PS conceals the consumer identifiers from the advertiser A by substituting identifiers chosen by the node with identifiers chosen by the proxy server. In this way, the proxy server further shields the identity of the consumer $C_i$. Having received the request pairs, the advertiser A selects a plurality of advertisements $ad_i$ (STEP 45) and sends a plurality of response pairs to the proxy server PS (STEP 46). Each of the response pairs comprises an advertisement $ad_i$ and an identifier $x_i$ as provided by the proxy server. The proxy server distributes the advertisements to individual consumers according to their identifiers (STEP 47).

The embodiments of FIG. 3 and FIG. 4 are robust and enjoy profile privacy. Because of the simplicity of these embodiments, in many cases these embodiments may be appealing from a practical standpoint. From an implementation standpoint, the use of a proxy server PS helps hide the identity of consumer nodes $C_i$, but puts a performance burden on the proxy server PS.

Figure 5:
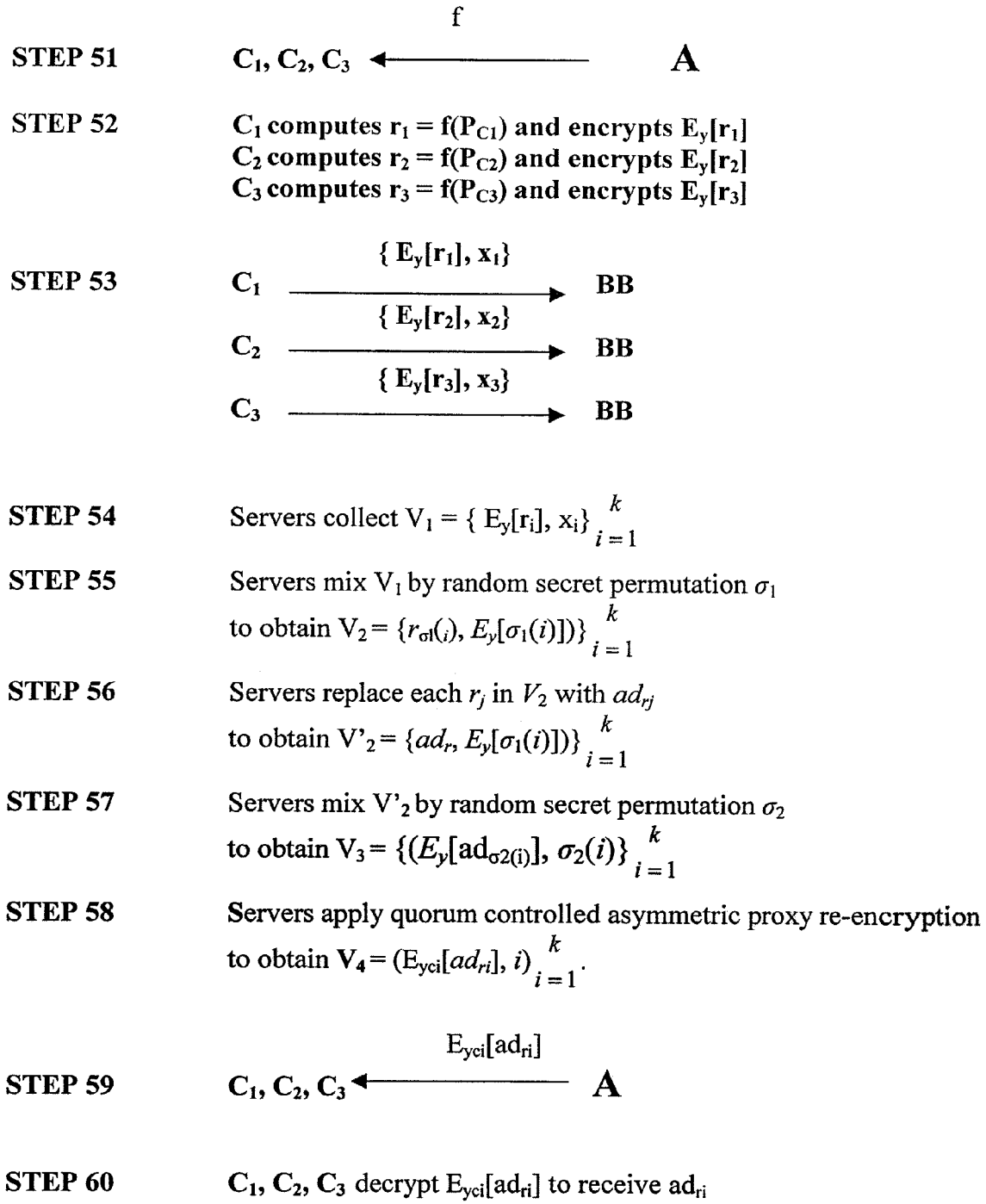
FIG. 5 is a flow diagram of another embodiment of a method of the present invention.

Referring to FIG. 5, a preferred embodiment of the present invention is a semi-private PIR protocol, meaning that consumers $C_1, C_2, \ldots, C_k$ can receive respective advertisements $ad_{r1}, ad_{r2}, \ldots, ad_{rk}$ in such a way that the servers learn information requests only in the aggregate. This embodiment uses a combination of the El Gamal cryptosystem and a mix network to provide this measure of privacy protection and security.

The El Gamal cryptosystem is a public-key cryptosystem, wherein encryption takes place over a group $G_q$ of prime order q. This system is described in detail in "A Public Key Cryptosystem and a Signature Scheme Based on Discrete Logarithms" by T. El Gamal published in "IEEE Transactions on Information Theory", v. IT-31, 1985, pp. 469-472.

Typically, $G_q$ is taken to be a subgroup of $Z_p^*$, where $q|(p-1)$. A generator g of $G_q$ is a system parameter that may be used in multiple key pairs. An El Gamal private encryption key consists of an integer $x \in_U Z_q$, where $\epsilon_U$ denotes uniform random selection. The corresponding public key is defined to be $y = g^x$. To encrypt a message $M \in G_q$, the sender selects $z \in_U Z_q$, and computes the ciphertext $(\alpha, \beta) = (My^z, g^z)$, where it may be seen that $\alpha, \beta \in G_q$. To decrypt this ciphertext using the private key x, the receiver computes $\alpha/\beta^x = My^z/(g^z)^x = M$.

The El Gamal cryptosystem possesses several properties that are useful to achieve the privacy protection and security of the negotiant protocol. This cryptosystem is semantically secure, which means that an adversary who intercepts an encrypted message pair $(m_0, m_1)$ is unable to distinguish between encryptions of these two messages with probability non-negligibly greater than ½.

Further, the El Gamal cryptosystem is also probabilistic, which means that a large number of ciphertexts will decrypt to a given plaintext, and the particular ciphertext used in any given encryption is randomly chosen. As a result, an adversary with knowledge of the public key can not recover the message by encrypting random plaintext looking for the correct ciphertext.

The El Gamal cryptosystem possesses a homomorphism under the operator $\otimes$. Let $(\alpha_0, \beta_0) \otimes (\alpha_1, \beta_1) \equiv (\alpha_0\alpha_1, \beta_0\beta_1)$. If $(\alpha_0, \beta_0)$ and $(\alpha_1, \beta_1)$ represent ciphertexts corresponding to plaintexts $M_0$ and $M_1$ respectively, then $(\alpha_0, \beta_0) \otimes (\alpha_1, \beta_1)$ represents an encryption of the plaintext $M_0 M_1$. A consequence of this homomorphic property is that it is possible, using knowledge of the public key alone, to derive a random re-encryption $(\alpha^1, \beta^1)$ of a given ciphertext $(\alpha, \beta)$. This is accomplished by computing $(\alpha^1, \beta^1) = (\alpha, \beta) \otimes (\gamma, \delta)$, where $(\gamma, \delta)$ represents an encryption of the plaintext value 1. Other embodiments of the invention use public key cryptosystems other than El Gamal that have homomorphisms. The homomorphisms allow re-encryption in a manner analogous to the re-encryption just described. For example, the Paillier's probabilistic encryption scheme has an additive homomorphism. As another example, the RSA cryptosystem has a multiplicative homomorphism, although RSA is not semantically secure per se. Also, Nacacche-Stern and Fujisati-Okamoto are known public key cryptosystems that have homomorphisms.

This embodiment of the invention also makes use of a mix network, which is a distributed threshold cryptographic protocol for interleaving multiple channels so as to anonymize them. A mix network takes as input a vector of ciphertexts denoted by $V = \{E_y[M_1], E_y[M_2], \ldots, E_y[M_n]\}$, where $E_y[M]$ represents the encryption under public key y of message M in a probabilistic public-key cryptosystem. Output from the mix network is the vector $V^1 = \{E_y[M_{94,(1)}], E_{y[M94(2)]}, \ldots, E_y[M_{\sigma(n)}]\}$, where $\sigma$ is a random permutation on n elements A mix network may also take ciphertexts and/or plaintexts as inputs and likewise output a combination of plaintexts and ciphertexts as desired. Implementations of mix networks are described in, for example, "Flash Mixing" by M. Jakobsson, published in PODC '99, pages 83-89. ACM, 1999, "Universally Verifiable Mix-Net with Verification Work Independent of the Number of Mix-Servers" by M. Abe, published in EUROCRYPT '98, K. Nyberg, editor, Springer-Verlag, 1998, pp. 437-447, and "Millimix: Mixing in Small Batches," by M. Jakobsson and A. Juels, DIMACS Technical Report 99-33, 1999.

In this embodiment, the advertiser A is represented by a plurality of servers $S_1, S_2, \ldots, S_m$. Each server $S_1, S_2, \ldots, S_m$ has a public/private El Gamal key pair (y, x). Also, each consumer $C_i$ has a public/private El Gamal key pair $(yc_i, xc_i)$, and an identifier $x_i$ associated with her. As a preliminary step, the servers provide each consumer $C_1, C_2, C_3$, with a negotiant function $f$ (STEP 51). At the time of information request, each consumer $C_i$ computes the negotiant function $f$ using input $P_i$ and obtains the result $r_i = f(P_i$ (STEP 52). The consumer $C_i$ posts the result $r_i$ encrypted with the servers' public key $y_i$, and the unencrypted identifier $x_i$ ($E_y[r_i], x_i$) to the bulletin board (STEP 53). The result/identifier pairs are collected for a predetermined time, or until a predetermined number of pairs k are posted, and the number of pairs k is determined (STEP 54). We refer to the group of ciphertext/plaintext pairs accumulated when a group of consumers have posted their requests as the vector $V_1 = \{Ey[r_i], x_i\}_{i=1}^k$.

The servers apply a mix network to $V_1$, to obtain $V_2$ (STEP 55). The mix network encrypts first column elements and simultaneously decrypts second column elements. Thus $V_2$ is a vector of pairs $\{(r_{94\ 1(i)}, E_y[\sigma_1;(i)])\}^k_{i=1}$ for random, secret permutation $\sigma_1$. The servers next replace each integer $r_j$ in $V_2$ with $ad_{r_j}$ (STEP 56). The resulting vector is referred to as $V'_2$. The servers then apply a mix network to $V'_2$ to obtain a vector $V_3$, where $V_3$ is a vector of pairs $\{(E_y[ad_{\sigma 2(i)}], \sigma_2(i))\}^k_{i=1}$, and $\sigma_2$ is second random, secret permutation (STEP 57). For each element in $V_3$, $\{(E_y[ad_{ri}], x_i)$, the servers apply quorum controlled asymmetric proxy re-encryption to obtain $V_4 = (E_{yci}[ad_{ri}], x_i)$ (STEP 58). A quorum controlled asymmetric proxy re-encryption is a threshold cryptographic protocol enabling an El Gamal ciphertext encrypted under public key y to be re-encrypted under a new public key $y^1$. In this embodiment, an input to the protocol is a consumer's $C_i$ El Gamal public key $yc_i$ and a ciphertext $E_y[M]$. The output of the protocol is $E_{yci}[M]$. This protocol is computationally secure because it is robust against any adversary controlling any minority coalition of cheating servers, and also preserves the privacy against such an adversary.

For each element $(E_{yci}[ad_{ri}], i)$ in $V_4$, the servers send $E_{yci}[ad_{ri}]$ to $C_i$, based on the identifier $x_i$ (STEP 59). The consumers can then decrypt their respective ciphertexts $E_{yci}[ad_{ri}]$. (STEP 60).

The security of the protocol is predicated on that of the underlying mix network. If a threshold mix network is used, it may be shown that this embodiment is a semi-private PIR protocol, with ([m/2], m)-group privacy, relative to the Decision Diffie-Hellman assumption. In other words, the protocol retains group privacy against an adversary controlling a minority coalition of servers. This embodiment may also be shown to be robust in this case relative to the discrete log assumption. The discrete log assumption is a standard supposition in cryptography that assumes that, given an appropriate group G with generator g, one cannot compute $\log_g$ of a random element y, where $y \in G$.

Figure 6:
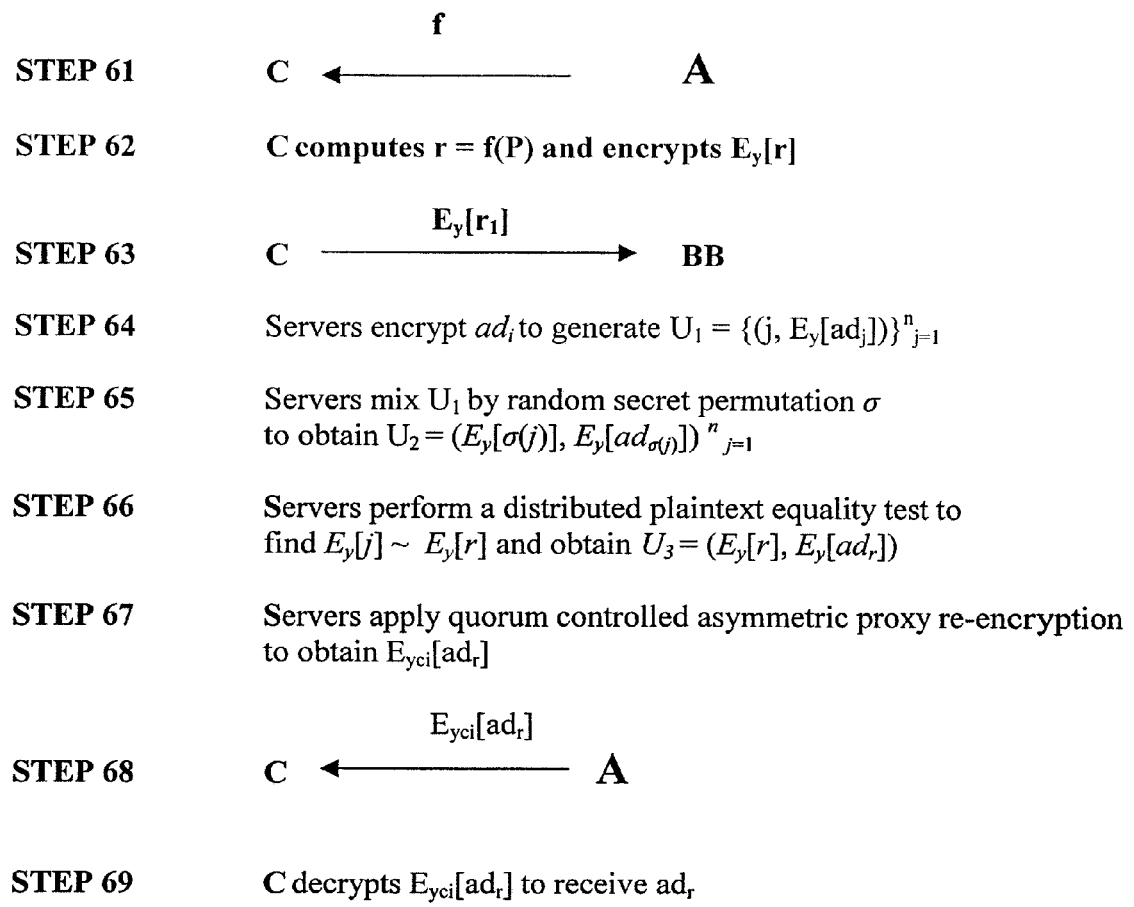
FIG. 6 is a flow diagram of another embodiment of a method of the present invention.

Referring to FIG. 6, illustrated is a flow diagram of another embodiment of the present invention. In this embodiment, the semi-private PIR protocol described in reference to FIG. 5 is converted into a threshold PIR protocol with a few extra steps, and at the expense of additional computational overhead. The idea is to perform a blind lookup of consumer advertisement requests. This is accomplished by mixing advertisements and then invoking the distributed plaintext equality test. The distributed plaintext equality test is a threshold cryptographic protocol whereby, given El Gamal ciphertexts $(\alpha, \beta)$ and $(a^1, \beta^1)$, a plurality of participants determines whether the underlying plaintexts are identical. Each participant in turn blinds the publicly computable ciphertext $(\gamma, \delta) = (\alpha/\alpha^1, \beta/\beta^1)$ by raising both integers in the pair to a common random exponent, and then proves non-interactively the blinding correct. The resulting blinded ciphertext is then jointly decrypted by the participants, yielding the value 1 if the underlying plaintexts are equivalent and a random value otherwise. Equality of underlying plaintexts in the two ciphertexts $(\alpha, \beta)$ and $(\alpha^1, \beta^1)$ is denoted as $(\alpha, \beta) \sim (\alpha^1, \beta^1)$.

In this embodiment, the advertiser A is also represented by a plurality of servers $S_1, S_2, \ldots, S_m$ Each server $S_1, S_2, \ldots, S_m$ has a public/private El Gamal key pair (y, x). The construction is such that processing consumer requests one at a time is no less efficient as processing many simultaneously. The protocol is, therefore, presented as applied to a single consumer C with profile P, and public/private key pair $(y_c, x_c)$. As a preliminary step, the servers provide the consumer C, with a negotiant function $f$ (STEP 61). At the time of information request, the consumer C computes the negotiant function $f$ using input P and obtains the result $r=f(P)$ (STEP 62). The consumer C posts the result $r=Ey[r]$ encrypted with the servers' public key y to the bulletin board (STEP 63). The servers then encrypt the set of advertisements AD. We refer to the group of ciphertext/plaintext pairs accumulated when the set of advertisements $ad_j$ is encrypted as the vector $U_1=\{j, E_y[ad_j])\}^n_{j=1}$, where j is the identifier associated with the advertisement $ad_j$ (STEP 64). The servers apply a mix network to $U_1$, to obtain $U_2$ (STEP 65). The mix network encrypts first column elements. Thus $U_2$ is a vector of pairs $(E_y[\sigma(j)], E_y[ad_{\sigma(j)}])^n_{j=1}$ for random, secret permutation $\sigma$ For each advertisement identifier j, the servers perform a distributed plaintext equality test to see whether $E_y[j] \sim E_y[r]$. When a match is found, this yields the ciphertext pair $U_3=(E_y[r], E_y[ad_r])$ (STEP 66). The servers then apply quorum controlled asymmetric proxy re-encryption to obtain $E_{yc}[ad_r]$ (STEP 67). In this embodiment, an input to the protocol is a consumer's $C_i$ El Gamal public key $yc_i$ and a ciphertext $E_y[ad_r]$. The output of the protocol is $E_{yci}[ad_r]$. The server then sends $E_{yc}[ad_r]$ to the consumer C, who decrypts $E_{yc}[ad_r]$ to obtain $ad_r$ (STEPS 68-69).

If a threshold mix network is used, this protocol enjoys ($[m/2]$, m)-privacy under the Decision Diffie-Hellman assumption. It is also in this case robust in the random oracle model. The bulk of the computational effort in this protocol occurs in step 65, in which a vector of ads must be mixed for every consumer. This step is not consumer-specific, and may be performed offline, or even by a different set of servers than those responsible for executing steps 66 and 67.

The efficiency of the embodiments just described may be improved by implementing following optional features.

Aggregation and offline mixing. Mix networks involve computationally intensive cryptographic operations, and as such are not typically practical for applications in which mixing results must be produced on the fly. The mixing operations in the embodiments described with reference to FIGS. 5-6 can be scheduled so that execution takes place offline. Under this approach, the first time consumer $C_i$ visits a web site controlled by the advertiser A, she submits $f(P_i)$. On this first visit, she does not receive the targeted advertisement $ad_{f(Pi)}$; instead she may receive a generic advertisement. In the interval of time between her first and second visits, however, her request $f(P_i)$ is aggregated with those of other consumers, and the servers perform the necessary mixing operations. On the second visit of $C_i$, then, her requested advertisement $ad_{f(Pi)}$ will be determined and directed to her. She may at this point request another advertisement to be ready on her third visit, and so on. In other words, consumer advertisement requests may be scheduled in such a way that aggregation and processing occurs between visits, rather than at the time of each visit. Alternatively, the advertiser may setup a schedule for distributing targeted advertisements. For example, mixing of advertisement requests may take place overnight so that a consumer receives an advertisement the next day after transmitting a request. Alternatively yet, servers may perform mixing operations when a predetermined number of new advertisement requests have been received.

Bulk encryption. In the embodiments described with reference to FIGS. 5-6, an advertisement is represented as a single ciphertext. An advertisement may be represented as a sequence of associated ciphertexts. In one such embodiment, the advertisements are encrypted using an enveloping protocol involving both asymmetric and symmetric encryption. Such embodiments make use of a simple mix network which converts plaintext inputs to ciphertext outputs, using the El Gamal cryptosystem and its re-encryption properties. For example, if $\epsilon_k[M]$ represents a symmetric-key encryption of plaintext M, where $k \in_U K$ is a key drawn from keyspace K, an encryption of M is represented as $\overline{E}_y[M]=(\gamma, \delta)$, where $\gamma=\{E_y[k_1], E_y[k_2], \ldots, E_y[k_2]\}$ and $\delta = \epsilon_{k(z)}, \epsilon_{k(z-1)} \ldots \epsilon_1[M]$ for some integer z. To re-encrypt $\overline{E}_y[M]$ as $(\gamma', \delta')$, a server re-encrypts all ciphertexts in $\gamma$, selects $k_{z+1} \in_U K$, appends $E_y[k_{z+1}]$ to $\gamma$ to obtain $\gamma^1$ and computes $\delta'$ as $\epsilon_{k(z+1)}[\delta]$.

Although such an enveloping encryption protocol may hinder robustness, robustness is a less important consideration than privacy protection in the negotiant protocols. The incentive for a server to corrupt ads or substitute new ads is small, as such misbehavior would almost certainly become quickly apparent. Moreover, while it may not be possible to provide robustness in the mix network itself, a form of robustness may be achieved by having servers include encrypted signatures of the symmetric keys they have generated, and by formatting plaintexts in such a way that it is easy to identify a correct decryption. In this way, it is possible to enable consumers and servers together to detect and provide evidence of server misbehavior.

Reducing public-key operation costs. It should be noted that the most costly operations in our protocol, most notably El Gamal re-encryptions, involve fixed-base exponentiations in $G_q$. It is possible to reduce the cost of these operations through pre-computation methods described in, for example, "A Handbook of Applied Cryptography" by Alfred J. Menezes, Paul C. van Oorschot and Scott A. Vanstone, CRC Press, 1996, or even more effectively through use of addition chains described in, for example, "The Art of Computer Programming: Volume 2, Seminumerical Algorithms" by Daniel Knuth, $2^{nd}$ ed., Addison-Wesley, 1981.

Abuse Prevention. Despite cryptographic security guarantees disclosed herein, an advertiser with full control of the negotiant function $f$ can manipulate it so as to extract detailed profile information from individual consumers. A number of safeguards may be implemented to safeguard against such abuses as described below. These measures may be used individually or combined in a complementary fashion.

Open source negotiant function. In some embodiments, a negotiant function is designed to be easily reverse-engineered by consumers or watchdog organizations to encourage acceptance of this model. This may be implemented by requiring that $f$ be encoded in a high level language such as Java™, or even by providing user-friendly software tools for viewing the behavior of $f$. Consumers or organizations that deem $f$ unduly invasive may refuse to receive advertisements or lodge complaints against the advertiser. P3P mechanisms for mediation between consumers and Web sites might be used to mediate between the consumer and the negotiant function for the provider of the negotiant function $f$.

Seal of approval. The problem of verifying that $f$ does not threaten consumer privacy is somewhat similar to the problem of verifying that executable code does not contain malicious components. Thus, we may adopt an approach similar to the ActiveX system, which is used for verification of the safety of executable code. An organization that believes a given piece of code to be safe applies a digital signature to it prior to distribution. If a consumer trusts the holder of the certificate supporting the signature, then he has some assurance about the safety of the code. Similar approach may be adopted to negotiant functions, allowing watchdog organizations to apply digital signatures to negotiant code to provide an authenticable seal of approval.

Restricted negotiant language. Another approach to protecting clients against malicious code is the so-called sandbox approach known in the art. The sandbox idea dictates that code be executable only in a protected environment, i.e., that the permissible set of instructions be restricted so as to guarantee safety to the client. Similar a privacy-safe language may be adopted for $f$.

Consumer profile control. This safeguard permits the consumer to choose what portion of his or her profile to divulge to or conceal from $f$. P3P may serve as a natural platform to support this form of consumer control.

Controlled distribution of negotiant function. To ensure against the advertiser extracting consumer data by customizing $f$, it should be ensured that $f$ is employed in a homogeneous fashion during a given time period or distribution timetable. One possible means of enforcement is to have a signed and time-stamped hash of $f$ publicly posted by the advertiser with assurance of homogeneous distribution. Alternatively, $f$ might be distributed by a semi-trusted site not directly associated with the advertiser.

Further information about the operation of the invention may be found in the article attached hereto as Appendix A entitled "Targeted Advertising . . . And Privacy Too" by Ari Juels, incorporated herein by reference.

Having described embodiments of the invention, it will be apparent to those of ordinary skill in the art that other embodiments incorporating the concepts disclosed herein can be used without departing from the spirit and the scope of the invention. The described embodiments are to be considered in all respects only as illustrative and not restrictive. Therefore, it is intended that the scope of the present invention be only limited by the following claims.

What is claimed is:

1. A method for enabling targeted information retrieval while protecting consumer privacy by processing aggregated requests, the method comprising:
   (a) distributing a negotiant function for execution to a plurality of consumers, the negotiant function designed to produce an information request as output;
   (b) receiving a plurality of information requests, a first information request of the plurality of information requests associated with a first consumer and obtained by applying a first negotiant function to an element of data associated with the first consumer, a second information request of the plurality of information requests associated with a second consumer and obtained by applying a second negotiant function to an element of data associated with the second consumer; and
   after step (b), the steps of encrypting the plurality of information requests; and aggregating a plurality of request pairs $V_1$, said plurality of request pairs having a sequence, each of said plurality of request pairs comprising an encrypted information request and a consumer identifier.

2. The method of claim 1, the method further comprising, the step of applying a mix network to said plurality of request pairs $V_1$ obtain a plurality of request pairs $V_2$, the plurality of request pairs $V_1$ having a first sequence, each of the plurality of request pairs $V_1$ comprising an information request, said information request encrypted with a first public key and a first random encryption factor, and an identifier, the plurality of request pairs $V_2$ having a second sequence comprising the first sequence permuted by a first random secret permutation, each of the plurality of request pairs $V_2$ comprising the information request in plaintext and the identifier encrypted with a second public key and a second random encryption factor.

3. The method of claim 2, the method further comprising, the step of replacing the information request in each of the plurality of request pairs $V_2$ with an element of information to create a plurality of response pairs $V_2'$.

4. The method of claim 3, the method further comprising, the step of applying a mix network to the plurality of response pairs $V_2'$ to obtain a plurality of response pairs $V_3$, the plurality of response pairs $V_3$ having a third sequence comprising the second sequence permuted by a second random secret permutation, each of the plurality of response pairs $V_3$ comprising the element of information, said element of information encrypted with a third public key and a third random encryption factor, and the identifier in plaintext.

5. The method of claim 4, wherein the first public key, the second public key, and the third public key are a single public key.

6. The method of claim 4, the method further comprising, after step (b), the step of applying asymmetric proxy re-encryption to the plurality of response pairs $V_3$ to obtain a plurality of response pairs $V_4$, each of the plurality of response pairs $V_4$ comprising the element of information encrypted with a fourth public key and the identifier in plaintext.

7. The method of claim 6, the method further comprising, the step of making the element of information encrypted with the fourth public key available to a consumer based on the identifier.

8. The method of claim 6 wherein quorum-controlled asymmetric proxy re-encryption is applied to the plurality of response pairs $V_3$ to obtain a plurality of response pairs $V_4$, each of the plurality of response pairs $V_4$ comprising the element of information encrypted with the fourth public key and the identifier in plaintext.

9. The method of claim 8 wherein the fourth public key is a key of the consumer; and wherein making the element of information encrypted with the fourth key available to the consumer based on the identifier comprises transmitting the element of information encrypted with the fourth public key to the consumer in response to the identifier.

10. The method of claim 1 wherein:
   the elements of data associated with the first and second consumers includes demographic information about the first and second consumers, respectively;
   receiving the first information request includes receiving a first selection of advertisements from a plurality of advertisements, the first selection of advertisements being based on the demographic information about the first consumer; and
   receiving the second information request includes receiving a second selection of advertisements from a plurality of advertisements, the second selection of advertisements being based on the demographic information about the second consumer.

11. A method for targeted information retrieval while protecting consumer privacy by comparing blinded ciphertexts, the method comprising:
   (a) distributing a negotiant function for execution to a plurality of consumers, the negotiant function designed to produce an information request as output;
   (b) receiving a request pair in response to the negotiant function, the request pair comprising a consumer identifier and the information request and a first random encryption factor, the information request encrypted with the first public key and the first random encryption factor having a first underlying plaintext;
   (c) constructing a first plurality of information pairs, the first plurality of information pairs having a first sequence, each of the first plurality of information pairs comprising an element identifier and an element of information encrypted with a second public key and a second random encryption factor;

(d) applying a mix network to the first plurality of information pairs to obtain a second plurality of information pairs, the second plurality of information pairs having a second sequence comprising the first sequence permuted by a random secret permutation, each of the second plurality of request pairs comprising the element identifier encrypted with a third public key arid a third random encryption factor and the element of information re-encrypted with the third public key and the third random encryption factor, the element identifier encrypted with the third public key and the third random encryption factor having a second underlying plaintext; and (e) performing a distributed plaintext equality test to identify at least one of the second plurality of request pairs in which the second underlying plaintext is identical to the first underlying plaintext.

12. The method of claim 11 wherein the first public key, the second public key, and the third public key are a single public key.

13. The method of claim 11, the method further comprising, after step (e), the step of applying asymmetric proxy re-encryption to the at least one of the second plurality of request pairs in which the second underlying plaintext is identical to the first underlying plaintext to obtain at least one response pair, each of the at least one response pair comprising the element of information encrypted with a fourth public key and the consumer identifier.

14. The method of claim 13 wherein quorum-controlled asymmetric proxy re-encryption is applied to the at least one of the second plurality of request pairs in which the second underlying plaintext is identical to the first underlying plaintext to obtain at least one response pair, each of the at least one response pair comprising the element of information encrypted with the fourth public key and the consumer identifier.

15. The method of claim 14, the method further comprising, after step (e), the step of making the element of information encrypted with the fourth public key available to the consumer based on the consumer identifier.

16. The method of claim 15 wherein the step of making the element of information encrypted with the fourth public key available to the consumer based on the consumer identifier comprises transmitting the element of information encrypted with the fourth public key to the consumer in response to the consumer identifier.

* * * * *

UNITED STATES PATENT AND TRADEMARK OFFICE
CERTIFICATE OF CORRECTION

PATENT NO. : 7,472,093 B2
APPLICATION NO. : 09/802278
DATED : December 30, 2008
INVENTOR(S) : Ari Juels It is certified that error appears in the above-identified patent and that said Letters Patent is hereby corrected as shown below:

Claim 2, Column 13, Line 54, "pairs V1 obtain a plurality…" should read --pairs V1 to obtain a plurality…--.

Claim 11, Column 15, Line 7, "identifier encrypted with a third public key arid a third" should read --identifier encrypted with a third public key and a third--.

Signed and Sealed this

Tenth Day of February, 2009

JOHN DOLL
*Acting Director of the United States Patent and Trademark Office*